United States Patent
Cudok et al.

(10) Patent No.: US 10,465,790 B2
(45) Date of Patent: Nov. 5, 2019

(54) TORQUE TRANSMISSION ARRANGEMENT, AND DRIVE MODULE COMPRISING SAME

(71) Applicant: ZF FRIEDRICHSHAFEN AG, Friedrichshafen (DE)

(72) Inventors: Matthias Cudok, Ritschenhausen (DE); Klaus Reuter, Oberthulba (DE); Tomas Vnuk, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 354 days.

(21) Appl. No.: 15/302,725

(22) PCT Filed: Mar. 12, 2015

(86) PCT No.: PCT/EP2015/055123
§ 371 (c)(1),
(2) Date: Oct. 7, 2016

(87) PCT Pub. No.: WO2015/154937
PCT Pub. Date: Oct. 15, 2015

(65) Prior Publication Data
US 2017/0037955 A1    Feb. 9, 2017

(30) Foreign Application Priority Data
Apr. 9, 2014    (DE) .................. 10 2014 206 844

(51) Int. Cl.
*F16H 57/04*    (2010.01)
*B60K 6/40*    (2007.10)
(Continued)

(52) U.S. Cl.
CPC .......... *F16H 57/0476* (2013.01); *B60K 6/26* (2013.01); *B60K 6/38* (2013.01); *B60K 6/40* (2013.01);
(Continued)

(58) Field of Classification Search
CPC .................................................. F16H 57/0476
See application file for complete search history.

(56) References Cited

U.S. PATENT DOCUMENTS 4,968,157 A     11/1990   Chiba
8,337,350 B2 *  12/2012   Kakinami ............... B60K 6/26
                                                475/5

(Continued)

FOREIGN PATENT DOCUMENTS

DE    11 2006 000 382    2/2008
DE    10 2008 000 900   10/2009
(Continued)

*Primary Examiner* — Derek D Knight
(74) *Attorney, Agent, or Firm* — Cozen O'Connor (57) ABSTRACT

A torque transmission arrangement, particularly for an arrangement with an electric machine in a drive module of a hybrid vehicle or electric vehicle, for transmitting a torque from an output shaft, particularly a motor output shaft, to a drive shaft, particularly a transmission input shaft. The drive shaft further has at least one fluid guide channel in which a fluid can be guided in direction of the output shaft. A fluid-carrying element which guides fluid out of the fluid guide channel of the drive shaft into a radially outer region of the output shaft and is provided at the output shaft.

16 Claims, 3 Drawing Sheets

(51) Int. Cl.
  *H02K 7/00* (2006.01)
  *H02K 7/108* (2006.01)
  *B60K 6/26* (2007.10)
  *B60K 6/38* (2007.10)
  *B60K 6/48* (2007.10)
  *F16F 15/123* (2006.01)
  *H02K 7/10* (2006.01)
  *F16C 33/66* (2006.01)
  *F16C 35/077* (2006.01)
  *F16C 19/30* (2006.01)
  *F16C 19/32* (2006.01)
  *F16C 33/58* (2006.01)

(52) U.S. Cl.
  CPC ............ *B60K 6/48* (2013.01); *F16C 33/6677* (2013.01); *F16C 33/6681* (2013.01); *F16C 35/077* (2013.01); *F16F 15/123* (2013.01); *F16H 57/043* (2013.01); *F16H 57/0471* (2013.01); *H02K 7/006* (2013.01); *H02K 7/10* (2013.01); *H02K 7/108* (2013.01); *B60K 2006/4825* (2013.01); *B60Y 2200/92* (2013.01); *B60Y 2306/03* (2013.01); *B60Y 2400/4244* (2013.01); *B60Y 2400/48* (2013.01); *F16C 19/305* (2013.01); *F16C 19/32* (2013.01); *F16C 33/588* (2013.01); *F16C 2326/06* (2013.01); *Y02T 10/6252* (2013.01); *Y02T 10/641* (2013.01); *Y10S 903/902* (2013.01)

(56) References Cited

U.S. PATENT DOCUMENTS

| | | |
|---|---|---|
| 2002/0117356 A1 | 8/2002 | Wittkopp |
| 2007/0225098 A1 | 9/2007 | Tabata et al. |
| 2012/0242199 A1 | 9/2012 | Iwase et al. |

FOREIGN PATENT DOCUMENTS

| | | |
|---|---|---|
| DE | 10 2011 005 724 | 9/2012 |
| DE | 11 2010 004 773 | 10/2012 |
| DE | 10 2011 078 110 | 12/2012 |
| DE | 11 2013 000 295 | 8/2014 |
| JP | 2010 101399 | 5/2010 |
| JP | 2014 015962 | 1/2014 |
| KR | 10 2007 0 090 368 | 1/2008 |
| WO | WO 2013/118902 | 8/2013 |

\* cited by examiner

TORQUE TRANSMISSION ARRANGEMENT, AND DRIVE MODULE COMPRISING SAME

CROSS REFERENCE TO RELATED APPLICATIONS

This is a U.S. national stage of application No. PCT/EP2015/055123, filed on Mar. 12, 2015. Priority is claimed on German Application No.: DE10014206844.4, fled Apr. 9, 2014, the content of which is incorporated here by reference.

BACKGROUND OF THE INVENTION

1. Field of the Invention

The present invention is directed to a torque transmission arrangement, particularly an arrangement with an electric machine in a drive module of a hybrid vehicle or electric vehicle, for transmitting a torque from an output shaft, particularly a motor output shaft, to a drive shaft, particularly a transmission input shaft, and the drive shaft further has at least one fluid guide channel in which a fluid can be guided in direction of the output shaft.

2. Description of the Prior Art

Torque transmission arrangements of the type mentioned above, particularly for an arrangement with an electric machine in a drive module, are known in the art. For example, a drive module with an electric machine arranged in a wet chamber is described in DE 10 2011 078 110 in which the internal combustion engine and the electric machine are connected to one another and disconnected from one another via a wet clutch device depending on the required driving strategy. For this purpose, an output shaft can be connected to the clutch input to be fixed with respect to rotation relative to it and/or the rotor of the electric machine can be connected to a clutch output to be fixed with respect to rotation relative to it. Accordingly, when the clutch is closed the torque is transmitted from the internal combustion engine via the clutch input to the clutch output and from the latter to the transmission input shaft, whereas in electric motor operation the transmission input shaft can be driven via the rotor of the electric machine which is connected to the clutch output to be fixed with respect to rotation relative to it. Further, to reduce vibrations, the output shaft and the clutch input are connected to one another via a torsional vibration damper. The drive module known from the prior art has a rotor hub that is fixedly connected to the rotor of the electric machine and is connected to a transmission input shaft via a spline. Accordingly, the rotor hub can be driven via the rotor or, when the clutch is engaged, additionally via the internal combustion engine. The rotor hub is arranged coaxial to the output shaft and is radially and axially supported relative to the latter.

However, it is disadvantageous in the prior art that a cooling and lubricating fluid, particularly oil, which is introduced in a known manner via the transmission input shaft is sufficient for cooling and lubricating the clutch, but elements arranged farther radially outwardly of the output shaft, for example, the torsional vibration damper, cannot be sufficiently cooled or lubricated.

SUMMARY OF THE INVENTION

Therefore, it is an object of one aspect of the present invention to provide a torque transmission arrangement that provides optimized fluid guiding and lubrication, particularly for constructional elements arranged radially outwardly of the output shaft, without additional installation space and costs.

According to one aspect of the invention, a torque transmission arrangement, particularly for an arrangement with an electric machine in a drive module of a hybrid vehicle or electric vehicle, is provided for transmitting a torque from an output shaft, particularly a motor output shaft, to a drive shaft, particularly a transmission input shaft. The drive shaft further has at least one fluid guide channel in which a fluid can be guided in direction of the output shaft. This fluid is preferably a cooling and/or lubricating fluid, particularly an oil, by which parts of the torque transmission arrangement can be cooled, lubricated and/or actuated.

The present invention is based on providing a fluid-carrying element at the output shaft that guides fluid out of the fluid guide channel of the drive shaft into a radially outer region of the output shaft. Owing to the fact, already mentioned above, that only the clutch arrangement and the rotor can be sufficiently supplied with fluid with the conventional fluid guide channels but not elements or components arranged farther in the radially outer region of the output shaft, the fluid-carrying element allows fluid to be guided also into a radially outer region of the output shaft.

According to a further advantageous embodiment example, the output shaft is formed as a hollow shaft and an interior of the output shaft is configured to receive and/or guide the fluid. Because of this configuration, the fluid is guided out of the fluid guide channel of the drive shaft in direction of the fluid-carrying element at the output shaft.

Further, the drive shaft can be surrounded by at least one further shaft, particularly a rotor hub, which is formed as a hollow shaft. The further shaft can preferably extend into the output shaft constructed as a hollow shaft so that the fluid-receiving interior of the output shaft is advantageously constructed as an annular space between the output shaft and the further shaft. Accordingly, a fluid guide is provided by which fluid can be guided from the drive shaft through the further shaft into a space between the further shaft and the output shaft. To this end, the interior of the further shaft is formed particularly in fluidic connection with the fluid guide channel of the drive shaft and the fluid-receiving interior of the output shaft.

In this regard, it is noted in particular that the fluid-carrying element can also be used without the arrangement of a further shaft such as a rotor hub, for example.

According to a further advantageous embodiment example, the fluid-carrying element is formed as fluid passage channel through the output shaft. The fluid passage channel is preferably constructed such that it fluidically connects the fluid-receiving interior of the output shaft to the radially outer region of the output shaft. Fluid can be guided through this fluid passage channel directly out of the interior in direction of the radially outer region of the output shaft.

According to a further advantageous embodiment example, a substantially radially arranged bearing arrangement with a first substantially radially extending bearing ring and a second substantially radially extending bearing ring is arranged at an output-side end of the output shaft. The first bearing ring is preferably connected to the output shaft so as to be fixed with respect to rotation relative to it, while the second bearing ring is connected to and fixed to rotate with an element of the torque transmission arrangement that does not rotate with the output shaft. This bearing arrangement advantageously provides for an axial support of the output shaft or for an axial support of an element of the torque transmission arrangement arranged next to the output shaft.

In this respect, it is particularly preferable when one of the bearing rings is constructed as a fluid-carrying element, i.e., fluid can be guided from the interior of the output shaft through the bearing to an area radially outward of the output shaft. At least one of the bearing rings has an offset at its radially outwardly arranged region, which offset directs the fluid flowing through the bearing in direction of the radially outer region of the output shaft. Accordingly, fluid that exits from the bearing is not only spun radially outward in a directionless manner but can be directed to a specific location of application by the offset.

Further, in order to arrange the bearing correctly for an optimized guiding of fluid, elements for preventing rotation are arranged at the bearing, particularly at one of the bearing rings. These elements for preventing rotation are preferably formed radially inwardly and can be supported by a corresponding counter-piece at the output shaft and/or the element of the torque transmission arrangement that does not rotate with the output shaft.

The safeguard against faulty assembly ensures that the bearing is installed in the correct orientation so that the fluid-carrying element, particularly the offset, does not possibly deflect the fluid passing through the bearing in an unwanted direction.

According to a further advantageous embodiment example, a spacer disk is arranged between the bearing device and output shaft. This spacer disk serves particularly to fasten the bearing or drive-side bearing ring of the bearing device to the output shaft in a simple manner. On the other hand, differences in installation space can be equalized by means of this spacer disk.

Further, in order to achieve a particularly good guiding of fluid in the radially outer region of the output shaft, this spacer disk can have at least one fluid guide groove that provides a fluidic connection between the interior of the output shaft and the radially outer region. The amount of fluid to be transported can preferably be adjusted via the depth of the grooves. Further, since the spacer disk is usually a plastic element, it is possible to form a groove in an especially simple manner. A particularly simple and inexpensive fluid-carrying element can be provided in this way.

Beyond this, the fluid guide groove can be carried out at an angle α with respect to its radial orientation. In this way, it can advantageously be ensured that the fluid can also be guided reliably in direction of the radially outer region of the output shaft during the expected rotation of the spacer disk.

According to a further advantageous embodiment, the spacer disk extends axially at least partially over the drive shaft and/or partially over the bearing device. In this regard, the axial extension is preferably formed as a fastener, particularly as a snap-in element, for fastening the spacer disk to the output shaft and/or bearing device. The axial extensions make it possible to fasten the spacer disk to the output shaft or bearing device in a simple manner. If the axial extension is formed over both elements, i.e., the output shaft and the bearing device, both the output shaft and the bearing device can be detachably connected to the spacer disk.

Alternatively, of course, the spacer disk can also be fixedly connected to the output shaft and/or bearing device, for example, by gluing. Of course, it is also possible to fixedly connect the spacer disk on one side to the respective element and to provide an axial extension as fasteners on the other side. It is also possible, of course, to form the axial extension without any fastening element.

According to a further advantageous embodiment, the torque transmission arrangement has at least one preferably wet clutch device and/or a torsional vibration damper in the radially outer region of the output shaft. It is just such elements as these that must preferably be provided with coolant or lubricant, which can be introduced via the fluid-carrying element. Particularly when a torsional vibration damper is arranged in the radially outer region of the output shaft, the torsional vibration damper in the torque transmission arrangements known from the prior art is not sufficiently supplied with fluid because the fluid is only supplied to the wet clutch device. However, the fluid scattering in the interior and forming a fluid mist is not sufficient to supply the springs of the torsional vibration damper with sufficient cooling fluid or lubricating fluid. On the other hand, if the torque transmission arrangement is outfitted with the fluid-carrying element, a fluid can be selectively guided to the torsional vibration damper.

In this respect, it is particularly preferred when a primary side of the torsional vibration damper is connected to the output shaft fixed with respect to rotation relative to it and a secondary side of the torsional vibration damper is connected to an input side of the clutch device to be fixed with respect to rotation relative to it, and the fluid guided by the fluid-carrying element into the radially outer region of the output shaft can be guided to the secondary side of the torsional vibration damper. Proceeding therefrom, the fluid can then be guided directly to the springs of the torsional vibration damper. However, it is also possible, of course, especially when the fluid-carrying element is constructed as fluid passage channel through the output shaft, that the fluid passage channel opens into a hub region of the torsional vibration damper. A passage through one of the cover plates at the primary side or secondary side of the torsional vibration damper would then be unnecessary.

According to a further advantageous embodiment, a receiving space for the fluid supplied by the fluid-carrying element is formed between the secondary side and the input side of the clutch device. In this way, the fluid provided via the fluid-carrying element is not removed in an uncontrolled manner, for example, in direction of the wet clutch device, but rather is available selectively for lubricating or cooling the torsional vibration damper.

To supply the lubricating fluid and/or cooling fluid selectively to the springs of the torsional vibration damper, an opening is formed preferably in a secondary guide plate of the torsional vibration damper, via which opening the fluid can be guided into a spring space of the torsional vibration damper formed between the primary side and secondary side.

According to a further advantageous embodiment, the output shaft is simultaneously formed as torsional vibration damper hub.

Of course, it is also possible to provide cooling fluid and/or lubricating fluid at the primary side and/or directly in the hub area of the torsional vibration damper. This is particularly advantageous when the fluid-carrying element is formed as fluid passage channel.

A further aspect relates to a drive module which has an electric machine and a torque transmission arrangement described above in order to conduct a torque from the internal combustion engine and/or electric machine to an output unit, particularly a transmission.

Further advantages and advantageous embodiment forms are defined in the subclaims, the drawings and the description.

BRIEF DESCRIPTION OF THE DRAWINGS

The invention will be described in more detail in the following referring to embodiment examples shown in the drawings. In this regard, the embodiment examples are of a purely exemplary nature and shall not determine the protective scope of the application. The protective scope is defined solely through the accompanying claims. The drawings show:

DETAILED DESCRIPTION OF THE PRESENTLY PREFERRED EMBODIMENTS

Like elements or functionally equivalent elements are denoted by the same reference numerals in the following.

Figure 1:
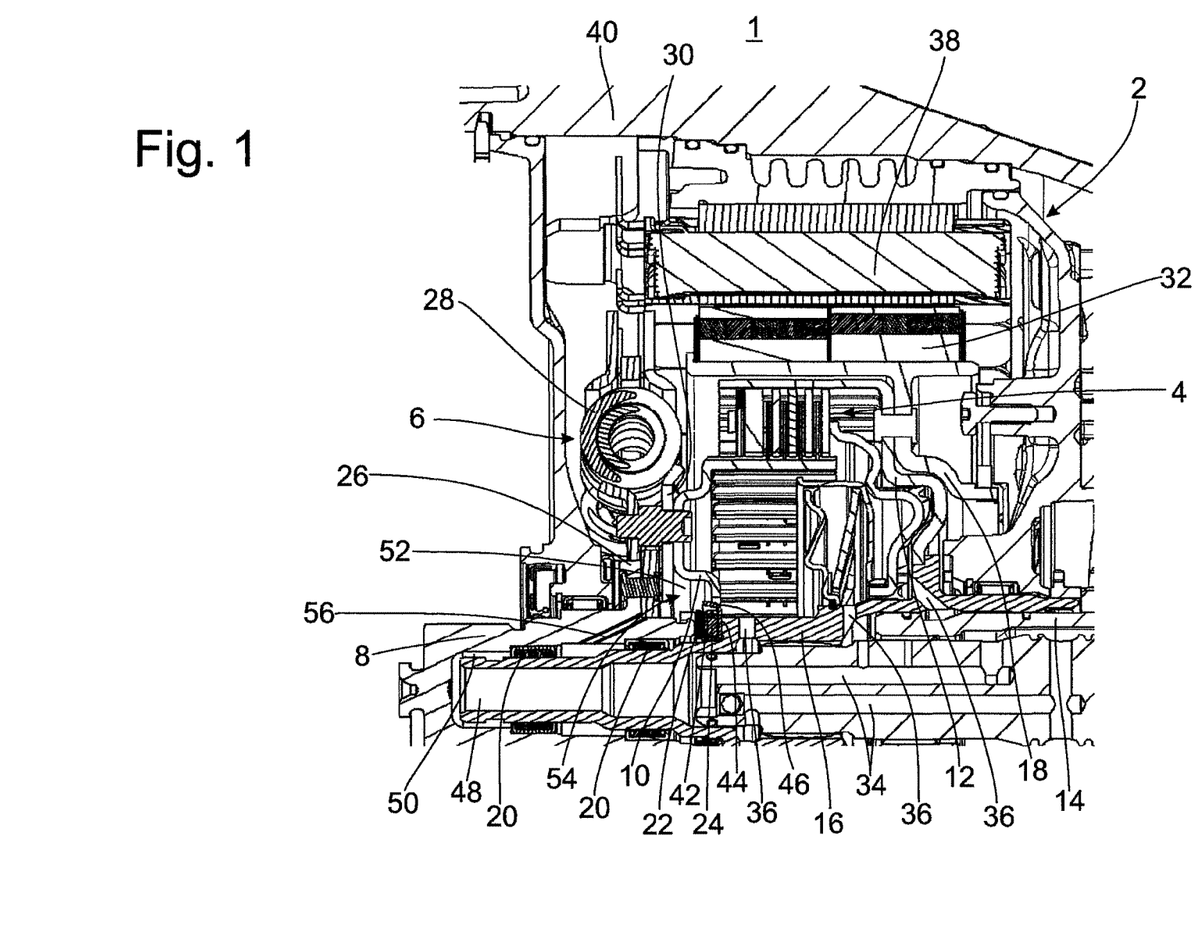
FIG. 1 is a schematic sectional view through a drive module with a torque transmission arrangement according to the invention.

FIG. 1 shows a schematic sectional view through a torque transmission arrangement 1 for a drive module for a hybrid vehicle or an electric vehicle with an electric machine 2 and a wet clutch device 4. It can further be seen from FIG. 1 that a torsional vibration damper 6 for compensating vibrations of an internal combustion engine (not shown) is arranged adjacent to the clutch device 4. If a torque is to be transmitted from the internal combustion engine to the transmission, this torque is introduced via an output shaft 8, which is connected to the internal combustion engine to be fixed with respect to rotation relative to it, via the torsional vibration damper 6 to an input side 10 of the clutch device 4. In the embodiment shown here, the input side 10 of the clutch device is formed as inner disk carrier. When the clutch device 4 is closed, the torque is transmitted to the clutch output side 12 which is formed in FIG. 1 as outer disk carrier. The output side 12 of the clutch device 4 is in turn connected to a driveshaft 14, particularly to a transmission input shaft 14, so as to be fixed with respect to rotation relative to it.

Further, in order to transmit a torque from the electric machine 2 to the transmission input shaft 14, a rotor hub 16 is provided that carries the outer disk carrier 12 and is connected via the latter to a rotor carrier 18 so as to be fixed with respect to rotation relative to it. In this regard, FIG. 1 further shows that the rotor hub 16 is formed as a hollow shaft and encompasses the transmission shaft 14 on the one hand and supports the output shaft 8 via bearings 20 on the other hand.

In the embodiment shown in FIG. 1, the output shaft 8 is simultaneously formed as a hub shaft for the torsional vibration damper 6. It can be further seen from FIG. 1 that the output shaft 8 is axially supported at the rotor hub 16 via a spacer disk 22 and a bearing 24.

The torsional vibration damper 6 is arranged in a radially outer region of the output shaft 8 and is formed with a guide plate 26 of a primary side fixed to rotate with the output shaft 8. The primary side 26 is in turn connected via a torsional vibration damper spring 28 to a guide plate 30 of a secondary side of the torsional vibration damper 6 that is constructed to be fixed to rotate with the input side 10 of the clutch device 4.

To actuate the clutch device 4 and to cool the clutch device 4 and electric machine 2, particularly the rotor 32, a cooling and/or lubricating fluid is supplied to the transmission input shaft 14. To this end, fluid guide channels 34 are provided in the transmission input shaft 14. Further, fluid outlet channels 36 via which the cooling and/or lubricating fluid can be guided to the clutch device 4 for actuating and cooling and further to the rotor 32 and stator 38 for cooling is provided at the transmission input shaft 14 and rotor hub 16. Because of the rotational movements of the clutch device 4 and rotor 32, respectively, this cooling and/or lubricating fluid spreads generally within a housing 40 of the torque transmission arrangement 1, but this fluid mist is not sufficient to lubricate the torsional vibration damper springs 28 sufficiently.

However, a sufficient lubrication of the springs 28 is necessary to reduce wear on the springs 28 and all of the elements of the torsional vibration damper in the area of its contacting surfaces, particularly in the area of the guide plates 26; 30 and springs 28. Wear occurs chiefly in that the springs 28 are supported at the guide plates 26; 30 of the primary side or secondary side of the torsional vibration damper 6. Deficient lubrication of these contacting surfaces leads on the one hand to diminished damping behavior of the torsional vibration damper 6, particularly because friction at the contacting surfaces is increased, and on the other hand shavings that might possibly occur can reach the space of the electric machine. This in turn can damage the electric machine 2, but at the least the electric machine 2 is subjected to higher wear.

To provide sufficient lubrication of the torsional vibration damper 6, a fluid-carrying element is provided which guides cooling and/or lubricating fluid directly to the torsional vibration damper 6. In the embodiment shown in FIG. 1, this fluid-carrying element is provided via the bearing arrangement 24 and the spacer disk 22, respectively. To this end, the bearing arrangement 24 has a first bearing ring 42 and a second bearing ring 44. In its radially outer area, bearing ring 44 forms an offset 46 which guides fluid flowing through the bearing 24 in direction of the torsional vibration damper 6. The specific constructions of the fluid-carrying element and the guiding of the fluid through the spacer disk 22 will be described in more detail later referring to FIGS. 2 to 5.

To guide the cooling and/or lubricating fluid from the channels 34 of the transmission input shaft 14 in direction of the fluid-carrying element, i.e., in the present case in direction of the bearing 24 or spacer disk 22, it is further provided to form the rotor hub 16 as a hollow shaft which, like the transmission input shaft 14, is constructed so as to be open on the combustion engine side so that cooling and/or lubricating fluid can be guided through an interior 48 of the rotor hub 16, exits the rotor hub 16 on the motor side and can be guided into an annular space 50 formed between the rotor hub 16 and output shaft 8. In the annular space 50, the fluid is guided in turn in direction of the transmission side and in this way lubricates bearing 20 and then passes through bearing 24 and spacer disk 22 into a space 52 which is formed between the input side 10 of the clutch device 4 and the secondary side 30 of the torsional vibration damper 6. From this receiving space 52, the fluid is again guided via an opening 54 in the guide plate 30 of the secondary side of the torsional vibration damper 6 into the interior of the torsional vibration damper 6, from where it is guided in direction of spring elements 28. In addition, the fluid-carrying element can also be constructed as a fluid passage channel 56 formed at the output shaft 8, this fluid passage channel 56 guiding fluid out of the annular space 50 directly to the torsional vibration damper 6.

Accordingly, the fluid-carrying element can be formed inter alia as fluid passage 56 through the output shaft 8, as spacer disk 22 and/or as bearing arrangement 24. The various configurations can be provided alone or in combination. Of course, other configurations of the fluid-carrying element are also possible.

Various configurations of the fluid-carrying element are discussed in the following description of FIGS. 2 to 5. In this embodiment, the fluid is guided via the spacer disk 22 and/or the bearing device 24.

Figure 2A:
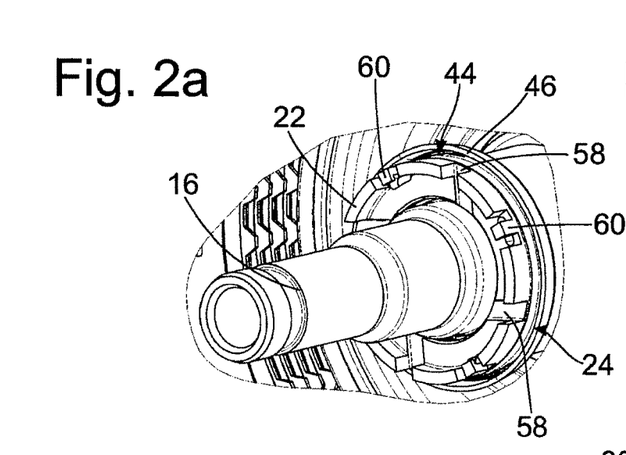
FIG. 2 is a first example of the fluid-carrying element in different views.
Figure 2B:
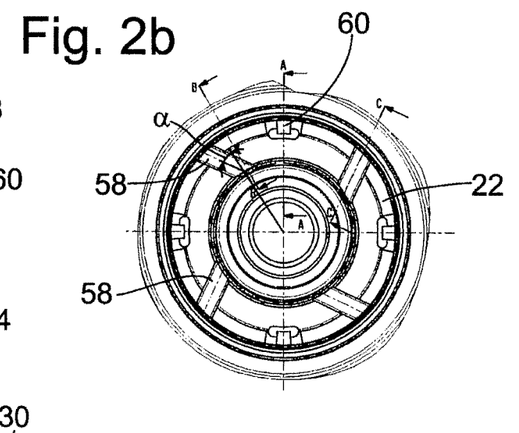

FIGS. 2a-2e shown different detailed views of the embodiment shown in FIG. 1. FIG. 2a shows a perspective schematic top view of the rotor hub 16 with spacer disk 22 arranged thereon and the bearing 24 arranged behind it. It can be seen clearly from FIG. 2a that the second bearing ring 44 of the bearing arrangement 24 has an offset 46 formed in the direction of the motor side, a fluid flowing through the bearing arrangement 24 being guided by the offset 46 in direction of the torsional vibration damper 6. It can further be seen from FIG. 2a that fluid passage grooves 58 are formed in the spacer disk 22. Fluid can also be guided from the annular space 50 into the intermediate space 52 through these fluid passage grooves 58. This fluid is also guided again via the offset 56 in direction of the torsional vibration damper 6. FIG. 2b shows the embodiment example in a top view of the motor side. It will be seen that the fluid grooves 58 in the spacer disk 22 are not formed radially but rather have an angle of attack a with respect to an axial orientation. This angle of attack a is selected such that a passage of fluid through the fluid passage grooves 58 is ensured in a particularly reliable manner during rotation of the output shaft and, therefore, also during rotation of the spacer disk 22.

It can also be seen from FIGS. 2a and 2b that the spacer disk 22 can be fastened to the output shaft by fastening elements 60, which are constructed in the form of snap tabs.

Figure 2C:
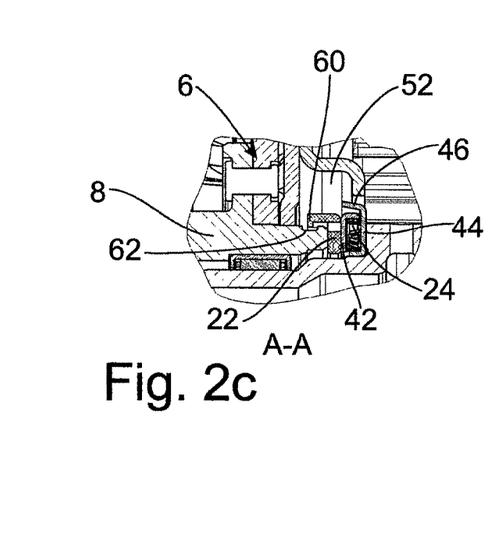
Figure 2D:
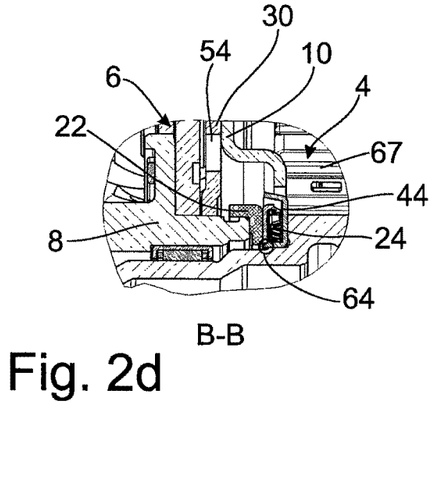
Figure 2E:
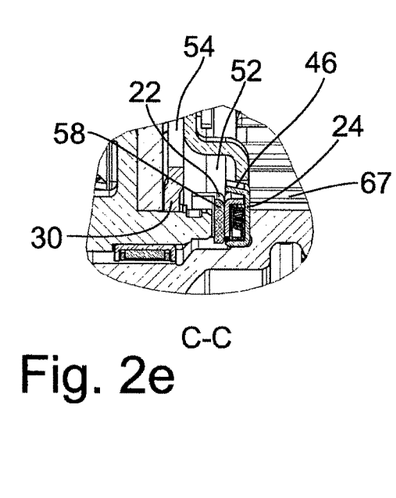

To this end, as can be seen in FIGS. 2c to 2e, the output shaft 8 further has a receiving groove 62 into which the snap tabs 60 can be snapped. Accordingly, the spacer disk 22 can be fixedly but detachably connected to the output shaft 8. Further, it can be seen from the sectional views in FIGS. 2c to 2e that the bearing ring 44 of the bearing arrangement 24 has the offset 46 inclined in direction of the torsional vibration damper 6. In this way, fluid which is guided in direction of the intermediate space 52 via the bearing arrangement 24 is carried in direction of the torsional vibration damper 6. Further, it can be seen particularly from FIG. 2d that the bearing ring 44 has at its radially inner region elements for preventing faulty assembly 64 that ensure that the bearing arrangement 24 is arranged in the torque transmission arrangement 1 so as to be correctly oriented; that is, if an assembly were shifted by 180° fluid would be deflected in direction of the input side of the clutch device and into an interior 67 of the clutch device 4 instead of in the direction of the torsional vibration damper 6.

FIG. 2e further shows that fluid is not guided only via the bearing arrangement 24 but also via the grooves 58 of the spacer disk 22 into the intermediate space 52. In this case, also, the offset 46 ensures that the fluid is carried in direction of the torsional vibration damper 6 and not in direction of the interior 67 of the clutch device 4. FIGS. 2d and 2e further show that the opening 54 via which the fluid present in the receiving space 52 can be guided in direction of the torsional vibration damper springs 28 so as to provide it with sufficient lubricant is formed in the guide plate 30 of the secondary side of the torsional vibration damper 6.

Figures 3, 4, 5:
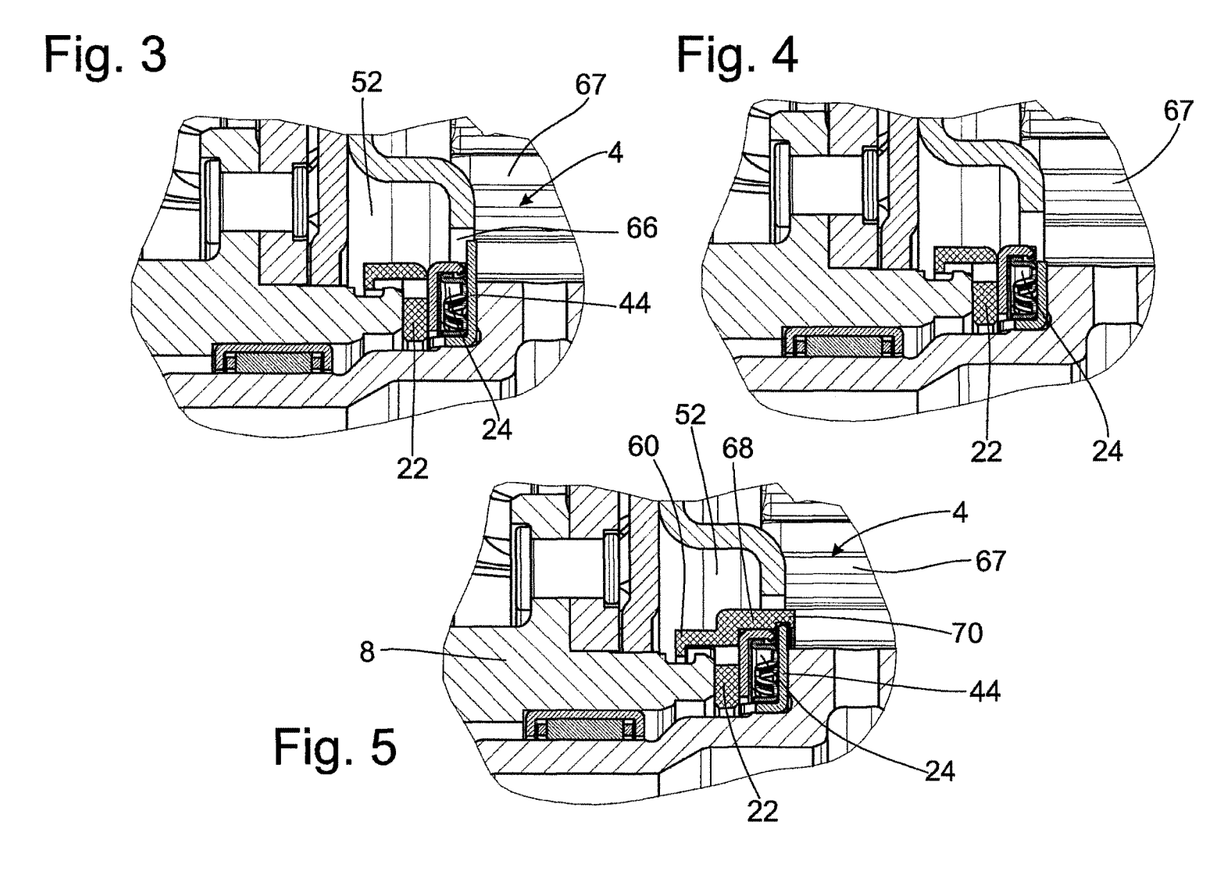
FIG. 3 is a schematic sectional view through the fluid-carrying element.
FIG. 4 is a schematic sectional view through the fluid-carrying element.
FIG. 5 is a schematic sectional view through the fluid-carrying element.

FIGS. 3, 4 and 5 show further particularly preferred embodiments of the spacer disk 22 and bearing arrangement 24, and only the differences will be described. In the embodiment example shown in FIG. 3, in contrast to the embodiment example shown in FIG. 2, the bearing ring 44 is not formed with an offset 46 but only has a radially outwardly extending lengthening which again blocks a passage area 66 between the intermediate space 52 and the interior 67 of the clutch device 4 so that fluid can only reach the interior 67 of the clutch device 4 to a very limited extent. But, of course, it is also possible to entirely dispense with this type of lengthening of the bearing ring 44 as is shown particularly in FIG. 4. In this regard, it is particularly advantageous when the fluid is guided for the most part via the spacer disk and less via the bearing device 24. This can be achieved, for example, via correspondingly dimensioned grooves 58.

FIG. 5 shows a further preferred embodiment example in which the spacer disk 22 not only has snap tabs 60 for fastening to the output shaft 8 but also at the same time extends axially in direction of the transmission over the bearing arrangement 24. A snap tab 70 cooperating with the outer ring 44 of the bearing arrangement 24 is in turn provided at the end of this axial extension 68. This has the advantage, for one, that the bearing arrangement 24 can also be fastened to the output shaft 8 already during assembly and, for another, the fluid passage 66 between intermediate space 52 and interior of the clutch device 4 can be reduced over the axial extension 68. In this embodiment example, the fluid is chiefly transported into the intermediate space 52 via the grooves 58 formed in the spacer disk 22. However, passage of fluid through the bearing arrangement 24 is only possible to a limited extent.

The present invention discloses a torque transmission arrangement 1 for transmitting a torque from an output shaft 8 to a drive shaft 14, wherein the drive shaft 14 has a fluid guide channel 34 in which a fluid can be guided in direction of the output shaft 8. A fluid-carrying element 22; 24; 56 is provided at the output shaft 8 and guides fluid from the fluid guide channel 34 of the drive shaft 14 into a radially outer region of the output shaft 8, and wherein the torque transmission arrangement 1 has a torsional vibration damper 6 in the above-mentioned radially outer region of the output shaft 8. Further, the fluid which is guided by the fluid-carrying element 22; 24; 56 from the fluid guide channel 34 of the drive shaft 14 into the radially outer region of the output shaft 8 can be guided into an interior space, particularly into a spring space, of the torsional vibration damper 6 with damper springs 28.

In other words, the torsional vibration damper 6 and the fluid-carrying element 22; 24; 56 are arranged substantially in the same axial area of the output shaft 8 so that a cooling and/or lubricating fluid can be guided directly, i.e., along the shortest possible path, to its destination. To this end, a spacer disk 22 and/or a bearing 24 can be constructed such that fluid can be guided directly into an outer region of the clutch arrangement 4 and, therefore, directly to the torsional vibration damper 6. Alternatively or additionally, the output shaft can also be outfitted with a fluid conduit. In this way, the guiding of fluid through a torque transmission arrangement can be facilitated overall without an undue increase in installation space or cost.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque transmission arrangement for an arrangement with an electric machine in a drive module of a hybrid vehicle or electric vehicle, configured to transmit torque from an output shaft to a drive shaft, comprising:
    at least one fluid guide channel arranged in the drive shaft and configured to guide a fluid towards the output shaft;
    a fluid-carrying element that guides the fluid out of the at least one fluid guide channel of the drive shaft into a radially outer region of the output shaft at the output shaft,
    wherein the output shaft is a hollow shaft and a fluid-receiving interior of the output shaft is configured to receive and/or guide the fluid, and
    at least one further shaft that surrounds the drive shaft and configured as a rotor hub, which is formed as a hollow shaft, wherein the at least one further shaft extends into the output shaft constructed as hollow shaft such that the fluid-receiving interior of the output shaft is formed as annular space between output shaft and further shaft,
    wherein the interior of the at least one further shaft is in fluidic connection with the at least one fluid guide channel of the drive shaft and the fluid-receiving interior of the output shaft.

2. The torque transmission arrangement according to claim 1, wherein the fluid-carrying element is a fluid passage channel through the output shaft that fluidically connects the fluid-receiving interior of the output shaft to the radially outer region of the output shaft.

3. The torque transmission arrangement according to claim 1, further comprising:
    a bearing arrangement that is substantially radially arranged and having a first substantially radially extending bearing ring and a second substantially radially extending bearing ring arranged at an output-side end of the output shaft,
    wherein the first bearing ring is connected to the output shaft so as to be fixed with respect to rotation relative to it, and the second bearing ring is connected to and fixed to rotate with an element of the torque transmission arrangement that does not rotate with the output shaft.

4. The torque transmission arrangement according to claim 3, wherein at least one of the first and second bearing rings is constructed as another fluid-carrying element, wherein the at least one of the first and second bearing rings extends radially outward beyond the bearing arrangement,
    wherein the at least one of the first and second bearing ring has an offset in its radially outwardly arranged region configured to direct the fluid flowing through the bearing arrangement in direction of the radially outer region of the output shaft.

5. The torque transmission arrangement according to claim 4, further comprising:
    a safeguard against faulty assembly arranged radially inwardly and formed at the bearing arrangement at at least one of the first and second bearing rings.

6. The torque transmission arrangement according to claim 5, further comprising:
    a spacer disk arranged between the bearing arrangement and the output shaft.

7. The torque transmission arrangement according to claim 6, wherein the spacer disk has at least one fluid guide groove arranged such that a fluidic connection is provided between the fluid-receiving interior of the output shaft and the radially outer region of the output shaft.

8. The torque transmission arrangement according to claim 7, wherein the at least one fluid guide groove is arranged at an angle α with respect to its radial orientation.

9. The torque transmission arrangement according to claim 8,
    wherein the spacer disk has an axial extension that extends axially at least partially over the output shaft and/or the spacer disk has an axial extension that extends axially at least partially over the bearing arrangement,
    wherein the axial extension is a fastener configured as a snap-in element, for fastening the spacer disk to the output shaft and/or bearing arrangement.

10. The torque transmission arrangement according to claim 1,
    wherein the torque transmission arrangement has at least one wet clutch device and/or a torsional vibration damper in the radially outer region of the output shaft.

11. The torque transmission arrangement according to claim 10, wherein the fluid guided by the fluid-carrying element from the at least one fluid guide channel of the drive shaft into the radially outer region of the output shaft is guided to the secondary side and/or into an interior of the torsional vibration damper.

12. The torque transmission arrangement according to claim 11, wherein a receiving space for the fluid supplied by the fluid-carrying element is formed between the secondary side and the input side of the clutch device.

13. The torque transmission arrangement according to claim 12, wherein the fluid is guided into a spring space of the torsional vibration damper formed between the primary side and secondary side via an opening formed in the secondary side.

14. The torque transmission arrangement according to claim 13, wherein the opening formed in the secondary side is in a secondary guide plate of the torsional vibration damper.

15. The torque transmission arrangement according to claim 1,
    wherein the torque transmission arrangement has at least one torsional vibration damper in the radially outer region of the output shaft,
    wherein a primary side of the torsional vibration damper is connected to the output shaft so as to be fixed with respect to rotation relative to it and a secondary side of the torsional vibration damper is connected to an input side of the clutch device so as to be fixed with respect to rotation relative to it.

16. A drive module comprising:
    an electric machine; and a torque transmission arrangement configured to conduct a torque from an output shaft of an internal combustion engine and/or electric machine to a drive shaft of a transmission comprising:
  at least one fluid guide channel arranged in the drive shaft and configured to guide a fluid towards the output shaft;
a fluid-carrying element that guides the fluid out of the at least one fluid guide channel of the drive shaft into a radially outer region of the output shaft at the output shaft,
wherein the output shaft is a hollow shaft and a fluid-receiving interior of the output shaft is configured to receive and/or guide the fluid, and
at least one further shaft that surrounds the drive shaft and configured as a rotor hub, which is formed as a hollow shaft, wherein the at least one further shaft extends into the output shaft constructed as hollow shaft such that the fluid-receiving interior of the output shaft is formed as annular space between output shaft and further shaft,
wherein the interior of the at least one further shaft is in fluidic connection with the at least one fluid guide channel of the drive shaft and the fluid-receiving interior of the output shaft.

* * * * *